United States Patent Office
3,459,835
Patented Aug. 5, 1969

3,459,835
CYCLIC PHOSPHORUS ESTERS AND PROCESS FOR THE PREPARATION THEREOF
James L. Dever, Lewiston, and James J. Hodan, Williamsville, N.Y., assignors to Hooker Chemical Corporation, Niagara Falls, N.Y., a corporation of New York
No Drawing. Filed July 27, 1966, Ser. No. 568,117
Int. Cl. C07d 105/04; C08g 45/50; C10m 7/44
U.S. Cl. 260—927                                    10 Claims

ABSTRACT OF THE DISCLOSURE

Cyclic esters of phosphorus of the formula

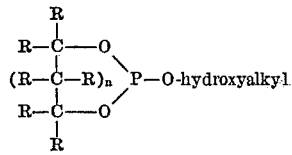

or

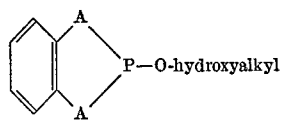

wherein A is a chalcogen, and corresponding polyesters and derivatives are made by reacting cyclic phosphorohalidites with hydroxyaliphatic compounds. The products resulting are useful as stabilizers for polyolefins, plasticizers, gasoline or lubricating oil and are fire retardants.

---

This invention relates to a process for preparing novel cyclic esters of phosphorus. More particularly, this invention relates to a process for preparing novel cyclic esters of phosphorus by reacting anhydrides of cyclic phosphorohalidites with hydroxyaliphatic compounds.

It is an object of this invention to provide a novel process for preparing cyclic esters of phosphorus. Another object is to provide a process which eliminates the need for acid acceptors utilized in the prior art processes. Still another object is to prepare novel cyclic esters of phosphorus. Other and further objects will become apparent to those skilled in the art from the following detailed description.

The cyclic esters of phosphorus prepared according to the process of the invention are selected from the group consisting of

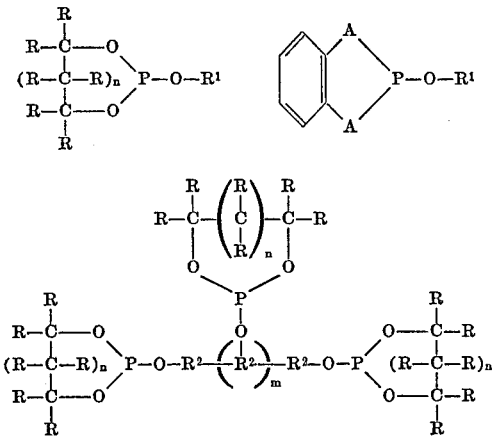

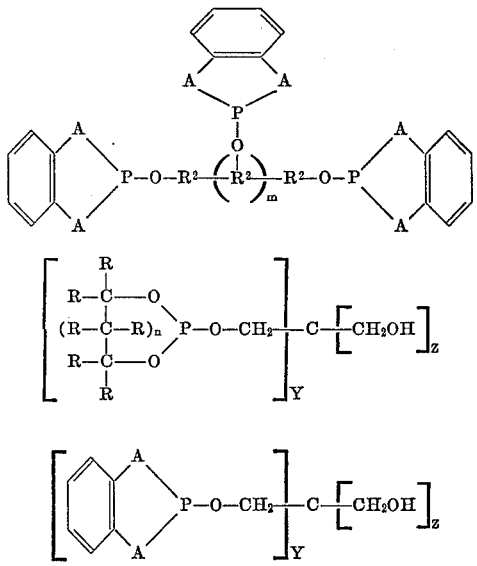

wherein R is independently selected from the group consisting of hydrogen and alkyl of 1 to 6 carbon atoms, preferably of 1 to 3 carbon atoms, $R^1$ is an alkyl of 1 to 24 carbon atoms, preferably of 1 to 18 carbon atoms, $R^2$ is alkylene of 1 to 18 carbon atoms, preferably of 1 to 12 carbon atoms, A is a calcogen independently selected from the group consisting of oxygen and sulfur, $m$ and $n$ are 0 to 1, Y is 1 to 4, Z is 0 to 3, and the sum of Z and Y is four.

Non-limiting examples of the compounds characterized above are 2-methoxy-1,3,2-dioxaphospholane,
2-butoxy-1,3,2-dioxaphospholane,
2-butoxy-1,3,2-dioxaphosphorinane,
2-pentoxy-1,3,2-dioxaphospholane,
2-octyloxy-1,3,2-dioxaphosphorinane,
2-decyloxy-1,3,2-dioxaphospholane,
2-lauryloxy-1,3,2-dioxaphosphorinane,
2-stearyloxy-1,3,2-dioxaphospholane,
4,5-benzo-2-methoxy-1,3,2-dioxaphospholane,
4,5-benzo-2-pentoxy-1-thia-3-oxa-2-phospholane,
4,5-benzo-2-lauryloxy-1,3,2-dioxaphospholane,
4,5-benzo-2-stearyloxy-1-thia-3-oxa-2-phospholane, as well as the compounds and the like.

The cyclic esters of phosphorus according to this invention are prepared by a process which comprises reacting under substantially anhydrous conditions a cyclic phosphorus anhydride selected from the group consisting of compounds characterized by the formulas

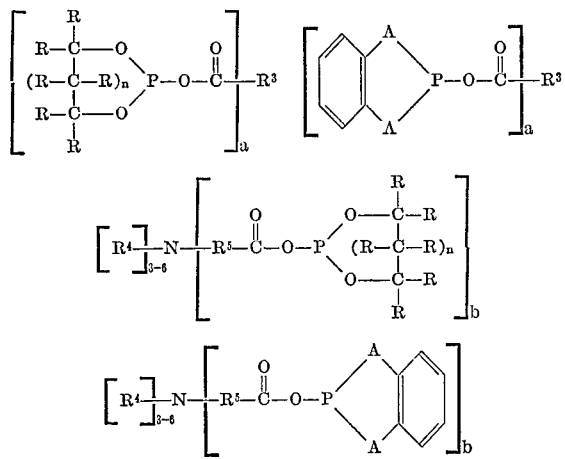

wherein $R^3$ is selected from the group consisting of hydrogen, alkyl and alkylene of 1 to 18 carbon atoms, preferably from 1 to 12 carbon atoms, alkenyl and alkenylene of 2 to 18 carbon atoms, preferably of 2 to 12 carbon atoms, aryl and arylene of 6 to 18 carbon atoms, preferably from 6 to 12 carbon atoms, aralkyl and aralkylene of 7 to 18 carbon atoms, preferably from 7 to 12 carbon atoms, $R^4$ is selected from the group consisting of alkyl of 1 to 12 carbon atoms, preferably of 1 to 6 carbon atoms, and aryl of 6 to 18 carbon atoms, preferably of 6 to 12 carbon atoms, $R^5$ is alkylene of 1 to 4 carbon atoms, A is calcogen independently selected from the group consisting of oxygen and sulfur, $a$ is 1 to 2, and $b$ is 1 to 3. When $a$ is 1, $R^3$ is hydrogen, alkyl, alkenyl, aryl or aralkyl, and when $a$ is 2, $R^3$ is alkylene, alkenylene, arylene or aralkylene, with a hydroxy-aliphatic compound selected from the group consisting of

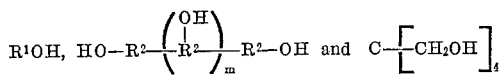

wherein $R^1$, $R^2$ and $m$ are as previously described, and thereafter recovering the desired cyclic esters of phosphorus.

Typical non-limiting examples of the cyclic phosphorus anhydrides utilized in the process of this invention are:

2-formyloxy-1,3,2-dioxaphospholane
2-acetoxy-1,3,2-dioxaphospholane
2-propionyloxy-1,3,2-dioxaphospholane
2-phenyloxy-1,3,2-dioxaphospholane
2-formyloxy-4-methyl-1,3,2-dioxaphospholane
2-acetoxy-4,5-dimethyl-1,3,2-dioxaphospholane
2-propionyloxy-4-ethyl-1,3,2-dioxaphospholane
2-butyryloxy-4,4-dimethyl-1,3,2-dioxaphospholane
2-acetoxy-5-butyl-5-ethyl-1,3,2-dioxaphospholane
2-formyloxy-1,3,2-dioxaphosphorinane
2-acetoxy-1,3,2-dioxaphosphorinane
2-propionyloxy-1,3,2-dioxaphosphorinane
2-butyryloxy-1,3,2-dioxaphosphorinane
2-formyloxy-5,5-dimethyl-1,3,2-dioxaphosphorinane
2-acetoxy-5,5-dimethyl-1,3,2-dioxaphosphorinane
2-propionyloxy-1,3,2-dioxaphosphorinane
4,5-benzo-2-acetoxy-1,3,2-dioxaphospholane
4,5-benzo-2-acetoxy-1-thia-3-oxa-2-phospholane
4,5-benzo-2-formyloxy-1,3,2-dioxaphospholane
4,5-benzo-2-formyloxy-1-thia-3-oxa-2-phospholane
4,5-benzo-2-propionyloxy-1,3,2-dioxaphospholane and
4,5-benzo-2-butyryloxy-1-thia-3-oxa-2-dioxaphospholane.

When dicarboxylic acid salts are employed, as hereinafter described, to prepare the intermediate cyclic phosphorus anhydrides, the bis(1,3,2-dioxaphospholanes), bis-(1,3,2 - dioxaphosphorinanes), bis(4,5-benzo-1,3,2-dioxaphospholanes) or bis(4,5-benzo-1-thia-3-oxa-2-phospholanes) obtained are exemplified by

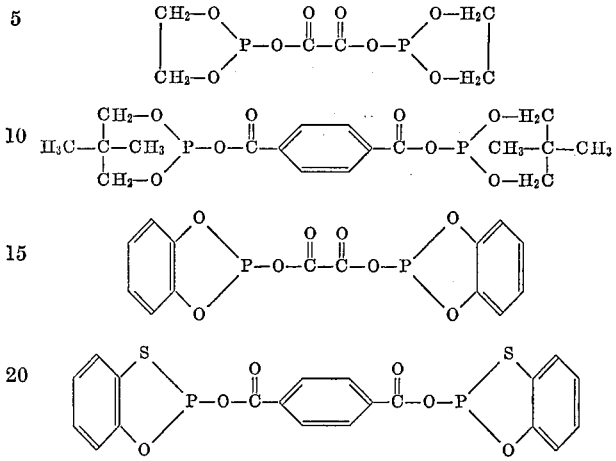

and the like.

When compounds of the formula

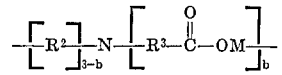

are employed, as hereinafter described, to prepare the intermediate cyclic phosphorus anhydrides, the anhydrides obtained are exemplified by

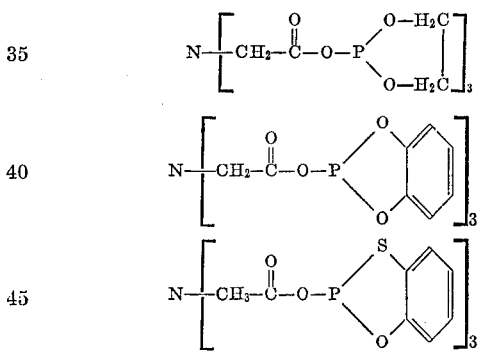

and the like.

Non-limiting examples of the hydroxy-aliphatic compounds utilized in the process of this invention are methanol, ethanol, propanol, isopropanol, butanol, isobutanol, pentanol, hexanol, heptanol, octanol, nonanol, decanol, undecanol, dodecanol, tridecanol, tetradecanol, pentadecanol, hexandecanol, heptadecanol, octadecanol, ethylene, glycol, dimethylolpropane, glycerol, trimethylolpropane, pentaerthritol and the like.

The cyclic anhydrides employed in the reaction are prepared by reacting under substantially anhydrous conditions a cyclic phosphorohalidite selected from the group consisting of compounds characterized by the formulas:

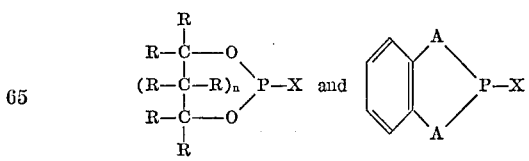

wherein R, A and $n$ are as previously described, and X is halogen, preferably chlorine or bromine, with a carboxylic acid salt selected from the group consisting of compounds characterized by the formulas:

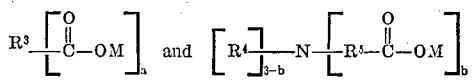

wherein $R^3$, $R^4$, $R^5$, $a$ and $b$ are as previously described, and M is selected from the group consisting of ammonium, alkali metal and alkaline earth metal. The reaction temperature is in the range of from about zero degrees centigrade to about 50 degrees centigrade. Examples of the phosphorohalidites utilized in the reaction are ethylene phosphorochloridite
ethylene phosphorobromidite
2-chloro-4-methyl-1,3,2-dioxaphospholane
2-chloro-4,5-dimethyl-1,3,2-dioxaphospholane
2-bromo-4-ethyl-1,3,2-dioxaphospholane
2-bromo-4,4-dimethyl-1,3,2-dioxaphospholane
2-chloro-4,4,5,5-tetramethyl-1,3,2-dioxaphospholane
2-chloro-5,5,4-triethyl-1,3,2-dioxaphospholane
2-chloro-4,5-triethyl-1,3,2-dioxaphospholane
2-chloro-1,3,2-dioxaphosphorinane
2-chloro-5,5-dimethyl-1,3,2-dioxaphosphorinane
2-bromo-5,5-dimethyl-1,3,2-dioxaphosphorinane
2-chloro-5,5-diethyl-dioxaphosphorinane
2-bromo-4,5,6-trimethyl-1,3,2-dioxaphosphorinane
2-chloro-5,5-dibutyl-1,3,2-dioxaphosphorinane
2-chloro-4,4,6-trimethyl-1,3,2-dioxaphosphorinane
4,5-benzo-2-chloro-1,3,2-dioxaphospholane
4,5-benzo-2-chloro-1-thia-3-oxa-2-phospholane
4,5-benzo-2-bromo-1,3,2-dioxaphospholane
4,5-benzo-2-bromo-1-thia-3-oxa-2-phospholane and the like Non-limiting examples of the carboxylic acid salts which may be effectively utilized to prepare the intermediate cyclic anhydrides are ammonium acetate, sodium acetate, potassium acetate, lithium acetate, calcium acetate, barium acetate, magnesium acetate, strontium acetate, ammonium propionate, sodium propionate, potassium propionate, ammonium butyrate, sodium butyrate, calcium butyrate, potassium valerate, calcium valerate, strontium valerate, sodium caproate, calcium caprylate, ammonium undecanoate, sodium laurate, ammonium laurate, potassium laurate, calcium laurate, sodium myristate, calcium myristate, sodium benzoate, ammonium benzoate, potassium benzoate, sodium phenylacetate, potassium phenylacetate, ammonium phenylpropionate, sodium phenylpropionate, potassium phenylbutyrate, calcium phenylbutyrate, sodium phenylvalerate, sodium acrylate, potassium acrylate, sodium oxalate, potassium oxalate, calcium malonate, potassium succinate, sodium succinate, sodium fumarate, calcium fumarate, ammonium phthalate, sodium phthalate, magnesium phthalate, potassium isophthalate, sodium terephthalate, trisodium nitrilotriacetate, trisodium nitrilotripropionate, tripotassium nitriltributyrate, disodium phenyliminodiacetate, sodium N,N - diphenylglycinate, dipotassium ethyliminodiacetate, ammonium phenyliminodiacetate, and the like In the practice of this invention, the reaction mixture of cyclic phosphorus anhydride and hydroxy-aliphatic compound may be prepared in any suitable manner, as for example, by means adapted for batch operation or the like.

Generally, the temperature at which the reaction is carried out may be in the range of from about $-10$ degrees centigrade to about 125 degrees centigrade. Preferably, temperatures within the range of from about 20 degrees centigrade to about 45 degrees centigrade are employed. Since the reaction is exothermic, the heat of reaction is removed, as, for example, by external cooling. Generally, atmospheric pressures are suitably employed. However, it is within the scope of this invention to utilize subatmospheric or superatmospheric pressures. The reaction time is dependent upon a variety of factors such as the concentration and nature of the reactants, temperature, pressure if employed, type of equipment employed and the like. Usually, reaction times of one to twelve hours are sufficient.

The reactants are reacted in substantially stoichiometric molar proportions. Thus, it is preferred to utilize 0.7:1 to 1.3:1 molar proportions, either reactant being in excess, when monohydroxy aliphatic compounds are reacted with monocyclic phosphorus anhydrides, or when dihydroxy aliphatic compounds are reacted with dicyclic phosphorus anhydrides. However, it is evident that the molar proportions of reactants will vary depending upon the particular combination employed. Accordingly, molar proportions of hydroxy-aliphatic compound to phosphorus anhydride in the range of 0.10:1 to 5:1, preferably 0.25:1 to 2:1, may be employed.

The process of this invention is most conveniently effected in the presence of an unreactive organic solvent. By unreactive is meant that the solvent is unaffected by and stable to the reactants, products and reaction conditions of the present process. Suitable unreactive solvents for the reaction will be readily recognized by those skilled in the art as including but not limited to tetrahydrofuran, dioxane, hexane and the like. As previously indicated, substantially anhydrous conditions are preferably maintained during the reaction. Thus, the reactants and solvents utilized in this novel process are substantially anhydrous.

The reaction mixture can be worked up in any conventional manner. If a product of high purity is desired, the solid constituents may be separated from the reaction mixture by filtration, decantation or the like, and the resulting filtrate stripped of solvent and reactants. If further separation or purification is desired, techniques such as distillation, extraction, crystallization or the like may be conveniently employed.

The cyclic phosphorus esters prepared in accordance with this invention find utility as stabilizers for polyolefins, plasticizers, gasoline or lubricating oil additives, reactive flame retardants and the like.

The following examples illustrate the process of the invention; however, they are not to be contrued as limiting the invention except as is described in the appended claims. All temperatures are in degrees centigrade and all parts are by weight unless otherwise indicated.

Example 1.—Preparation of the cyclic phosphorus anhydrides utilized as the reactants in this invention A reaction flask was charged with 39 parts of dry ammonium acetate and 155 parts of tetrahydrofuran. To this initial charge were added 63 parts of ethylene phosphorochloridite dropwise over a half-hour period while the temperature of the reaction vessel was maintained below 35 degrees centigrade, utilizing some external cooling. The reaction mixture was stirred over a two-hour period and filtered. The filtrate was stripped of solvent and the residue distilled to give 48 parts (64 percent conversion) of product. Redistillation of the residue yielded pure 2-acetoxy-1,3,2-dioxophospholane having a boiling point of 55 degrees centigrade at 0.5 millimeter of mercury absolute pressure. The structure of the compound is represented by the following formula:

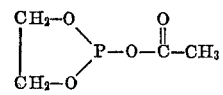

The product was analyzed and was found to contain 32.1 percent carbon; 4.8 percent hydrogen; and 20.5 percent phosphorus. The calculated percentages for these elements in a compound having the empirical formula: $C_4H_7O_4P$ is 32.0 percent carbon, 4.7 percent hydrogen, and 20.7 percent phosphorus. Infrared and nuclear magnetic resonance analysis verified the indicated structure.

Example 2

A reaction flask was charged with 75 parts of 2-acetoxy-1,3,2-dioxaphospholane. To this were added 37 parts of n-butanol dropwise over a period of 0.4 hour, at a temperature of 5–15 degrees centigrade, cooling as required. The resulting mixture was stirred for 15 minutes at ambient temperatures and gradually concentrated to 50 degrees centigrade at 2.75 millimeters of absolute pressure. Distillation yielded 56 parts (68 percent conversion) of 2-butoxy-1,3,2-dioxaphospholane, having a boiling point of 65–74 degrees centigrade at 3.2–3.8 millimeters of mercury. The index of refraction was $n_D^{25}$ 1.4440–1.4446. Redistillation of the product yielded a compound having a boiling point of 57.5–58 degrees centigrade at 2.7 millimeters of mercury absolute pressure. The product was found to contain 44.1 percent carbon, 8.1 percent hydrogen and 18.8 percent phosphorus. The calculated percentages for these elements in $C_6H_{13}O_3P$ are 43.9 percent carbon, 7.98 percent hydrogen and 18.9 percent phosphorus.

Example 3

A reaction flask was charged with 100 parts of 2-acetoxy-1,3,2-dioxaphospholane and was cooled to 8 degrees centigrade. Twenty-one parts of ethylene glycol dissolved in 18 parts of tetrahydrofuran were added dropwise, over a half-hour period, at a temperature between 12–16 degrees centigrade. The temperature was maintained in this range using an ice bath. The resulting mixture was stirred for 10 minutes at ambient temperature (12–16 degrees centigrade) and thereafter gradually concentrated to 75 degrees centigrade at 2.8 millimeters of mercury absolute pressure. Distillation of the mixture yielded 54 parts (66 percent conversion) of triethylene diphosphite having a boiling point of 99–106 degrees centigrade at 0.04–0.10 millimeter of mercury absolute pressure. The index of refraction was found to be $n_D^{25}$ 1.4889–1.4893. Redistillation of the product yielded a sample which was found to contain 29.9 percent carbon, 5.1 percent hydrogen and 25.5 percent phosphorus. The calculated percentages for these elements in $C_6H_{12}O_6P_2$ are 29.8 percent carbon, 5.0 percent hydrogen and 25.6 percent phosphorus.

Example 4

A reaction vessel was charged with 27 parts of pentaerythritol and 133 parts of tetrahydrofuran. To this initial charge were added 20 parts of 2-acetoxy-1,3,2-dioxaphospholane dropwise over a period of one hour. The mixture was stirred at room temperature for three hours, and the solvent removed at reduced pressure. This was followed by heating to 55–60 degrees centigrade, at 5 millimeters of mercury absolute pressure for a period of 28 hours. Acetic acid was collected in a Dry Ice trap. Ninety-two parts of product were collected as residue (93 percent conversion). The calculated percentages of these elements in $$C_{13}H_{24}O_{12}P_4$$

are 31.5 percent carbon, 4.9 percent hydrogen and 25 percent phosphorus. The product was found to contain 31.6 percent carbon, 5.0 percent hydrogen and 24.8 percent phosphorus.

Example 5

A reaction vessel was initially charged with 84 parts of ethylene phosphorochloridite, 45 parts of sodium formate and 45 parts of tetrahydrofuran. The resulting mixture was heated at 70–80 degrees centigrade for a period of three hours. Following cooling and stirring at ambient conditions for several hours, 49.5 parts of n-butanol were added dropwise over a period of 0.3 hour at 9–13 degrees centigrade using an ice bath for cooling. The mixture was stirred and filtered. The filtrate was stripped of solvent and byproduct at reduced pressure. Distillation of the residue yielded 64 parts (58.4 percent conversion) of colorless 2-butoxy-1,3,2-dioxaphospholane having a boiling point of 55–65 degrees centigrade at 3.3–2.5 millimeters of mercury absolute pressure.

Example 6

A reaction vessel was initially charged with 54 parts of pentaerythritol and 109 parts of 2-formyloxy-1,3,2-dioxaphospholane under a reduced pressure of 6 millimeters of mercury absolute. Heating was initiated and formic acid began to evolve. The mixture was heated at 60–70 degrees centigrade at 6 millimeters of mercury absolute pressure for a period of 1.7 hours. The product was obtained as a slightly cloudy colorless oily residue. Conversion was 100.8 percent or 127 parts. The product was found to contain 34 percent carbon, 5.9 percent hydrogen and 19.4 percent phosphorus. The calculated percentages for these elements in $C_9H_{18}O_8P_2$ are: 34.2 percent carbon, 5.7 percent hydrogen, 19.6 percent phosphorus.

Example 7

A reaction vessel was initially charged with 86 parts of 5,5 - dimethyl - 2 - acetoxy - 1,3,2 - dioxaphospholane and 71 parts of decyl alcohol. The mixture was heated at 65–70 degrees centigrade and 5 millimeters of mercury absolute pressure for a period of 1.7 hours. This was followed by concentration to 90 degrees centigrade at 5.0 millimeters of mercury absolute pressure. Distillation of the residue resulted in the recovery of 74.6 parts of product (58 percent conversion). The product was a clear, colorless 5,5-dimethyl-2-decyloxy-2,3,2-dioxaphospholane having a boiling point of 98–99 degrees centigrade at .08 millimeter of mercury absolute pressure. The product was found to contain 62 percent carbon, 10.6 percent hydrogen, and 10.9 percent phosphorus. The calculated percentages for these elements $C_{15}H_{31}O_3P$ are 62 percent carbon, 10.8 percent hydrogen and 10.7 percent phosphorus.

Example 8

A reaction vessel was initially charged with 49 parts of sodium acetate in 133 parts of tetrahydrofuran. To this were added 87 parts of 4,5-benzo-2-chloro-1,3,2-dioxaphospholane dropwise over a period of 0.4 hour at 30–35 degrees centigrade. This temperature was maintained by occasional cooling. The reaction mixture was stirred for 0.25 hour and 79 parts of decyl alcohol were added dropwise over 0.3 hour, while the temperature was maintained at about 30–37 degrees centigrade. The mixture was stirred for an additional hour and filtered. The solvent was removed at 75 degrees centigrade and 3 millimeters of mercury absolute pressure. The yield was 136 parts (92 percent conversion) of crude residue product. Distillation yielded 116 parts (78 percent conversion) of clear, colorless 4,5 - benzo - 2 - decyloxy - 1,3,2 - dioxaphospholane having a boiling point of 114–115 degrees centigrade at 0.04 milliliter of mercury absolute pressure. The product was found to contain 65 percent carbon, 8.7 percent hydrogen and 10.4 percent phosphorus. Calculated percentages for these elements in $C_{16}H_{25}O_3P$ are 64.9 percent carbon, 8.5 percent hydrogen and 10.4 percent phosphorus.

Example 9

A reaction vessel was initially charged with 127 parts of ethylene phosphorochloridite, 75 parts of sodium formate and 133 parts of tetrahydrofuran. The resulting mixture was stirred for a period of three hours, during which time the highest reaction temperature attained was 46 degrees centigrade. The mixture was filtered and stripped at 35 degrees centigrade and 28 millimeters of mercury absolute pressure. The colorless residue of 2-formyloxy - 1,3,2 - dioxaphospholane, 124 parts were charged into a flask and 145 parts of iso-decanol were added dropwise over a 0.7 hour period, at 25–35 degrees centigrade and 5 millimeters of mercury absolute pressure. The reaction temperature was gradually raised to 60 degrees centigrade at 5 millimeters of merucry absolute pressure over a period of 1.5 hours. A total of 36 parts (35 percent conversion) of formic acid were collected during this time. Distillation of the residue gave 146 parts (65 percent conversion) of clear, colorless 2-decyloxy-1,3,2-dioxaphospholane having a boiling point of 70–71 degrees centigrade at 0.05 millimeter of mercury absolute pressure. The compound was found to contain 58 percent carbon, 10.1 percent hydrogen and 12.6 percent phosphorus. The calculated percentages for these elements in $C_{12}H_{25}O_3P$ are 58.1 percent carbon, 10.1 percent hydrogen and 12.5 percent phosphorus.

Example 10

A reaction vessel was initially charged with 27 parts of sodium acetate and 88 of tetrahydrofuran. To this mixture were added 48 parts of 4,5-benzo-2-chloro-1-oxa-3-thia-2-phospholane dropwise over a period of 0.25 hour while the reaction temperature was maintained at about 30–40 degrees centigrade. The reaction mixture was stirred for an additional 0.75 hour and 40 parts of decyl alcohol was added dropwise over a period of 0.15 hour while the temperature was maintained below 40 degrees centigrade. The mixture was stirred for an additional 1.6 hours, filtered and stripped of solvent and by-product. Distillation yielded 53 parts (67.5 percent conversion) of clear, colorless, 4,5 - benzo - 2 - decyloxy - 1 - oxa - 3 - thia - 2 - phospholane having a boiling point of 138–140 degrees centigrade at 0.03 millimeter of mercury absolute pressure. The refractive index of the compound was $n_D^{25}$ 1.5310.

Example 11

A reaction flask was initially charged with 49 parts of sodium acetate and 308 parts of tetrahydrofuran. To this mixture were added 87 parts of 4,5-benzo-2-chloro-1,3,2-dioxaphospholane dropwise over a period of 0.45 hour while the temperature was maintained at 30–35 degrees centigrade. The mixture was stirred for 0.75 hour and 135 parts of stearyl alcohol were added in divided portions. The temperature was lowered to 15 degrees centigrade. The mixture was stirred for an additional three hours at ambient conditions and for one hour at 50 degrees centigrade. This was followed by filtration and stripping of solvent. The residue was concentrated to 197 degrees centigrade at 0.4 millimeter of mercury absolute pressure with no evidence of any distillate forming. The residue was filtered and on cooling completely solidified to a waxy, white product of 90 percent conversion.

Example 12

A reaction flask was charged with 159 parts of dry sodium benzoate and 264 parts of hexane. To this mixture were added 127 parts of ethylene phosphorochloridite over a 0.4 hour period at a temperature maintained at 35–45 degrees centigrade by occasional cooling after stirring the mixture for 0.75 hour. 32 parts of methanol were added dropwise over a 0.3 hour period. Following stirring for an additional 0.75 hour, the mixture was filtered and the solvent removed from the filtrate at reduced pressure. Distillation of the residue yielded 59 parts (49 percent conversion) of methyl ethylene phosphite having a boiling point of 63–66 degrees centigrade at 40 millimeters of mercury absolute pressure, and an index of refraction $n_D^{25}$ 1.4423. Literature values for methyl ethylene phosphite are: boiling point 60–62 degrees centigrade at 35 millimeters of mercury absolute pressure; and an index of refraction of $n_D^{25}$ 1.4425.

Example 13

A reaction flask was charged with 86 parts of anhydrous trisodium nitrilotriacetate and 165 parts of toluene. Then, 127 parts of ethylene phosphorochloridite were added dropwise over 0.3 hour period, while the temperature was maintained at about 46 degrees centigrade. After stirring the mixture for an additional 0.5 hour, 72 parts of n-butanol were added dropwise over a one hour period, while the temperature was maintained at about 30–35 degrees centigrade by means of occasional cooling. After stirring for an additional 0.5 hour, the mixture was filtered and the solvent removed from the filtrate at reduced pressure. Distillation of the residue yielded 88 parts (54 percent conversion) of ethylene butyl phosphite having a boiling point of 30 degrees centigrade at 0.2 millimeter of mercury absolute pressure and an index of refraction of $n_D^{25}$ 1.4439.

Example 14

A foam composition was prepared according to the following formulation:

| | Parts |
|---|---|
| Phosphite of the formula: $\left[\begin{array}{c}CH_2-O\\|\\CH_2-O\end{array}\right\rangle P-O-CH_2\Big]_2 C\begin{array}{c}CH_2OH\\ \\CH_2OH\end{array}$ | 10.0 |
| Oxyalkylated Novalak polyether polyol | 90.0 |
| Triethylamine | 0.5 |
| L–530 cell controller—Union Carbide (siloxane-oxyalkylene copolymers) | 0.5 |
| Freon 11 | 30.0 |
| Mondur, MR isocyanate—Mobay (crude diphenylmethane diisocyanate) | 108.0 |

The resulting foam had the following properties:

| | | |
|---|---|---|
| Density | lbs. cu. ft | 2.2 |
| Compressive strength | lbs. sq. in | 28 |

The fire resistance of the foam measured by the American Society for Testing Materials D–757 Test, was found to be 0.8 inch per minute. The foam was also subjected to the American Society for Testing Materials 1692 Test and found to be nonburning.

When the phosphite of Example 14 is replaced by a compound such as $$\left[\begin{array}{c}CH_2-O\\|\\CH_2-O\end{array}\right\rangle P-O-CH_2\Big]_1 C\begin{array}{c}CH_2OH\\-CH_2OH\\CH_2OH\end{array}$$

or $$\left[\begin{array}{c}CH_2-O\\|\\CH_2-O\end{array}\right\rangle P-O-CH_2\Big]_3 C-CH_2OH$$

similar results are obtained.

What is claimed is:

1. A compound selected from the group consisting of $$\left[\begin{array}{c}R\\|\\R-C-O\\|\\(R-C-R)_n\\|\\R-C-O\\|\\R\end{array}\right\rangle P-O-CH_2\Big]\!\!-\!C\Big[-CH_2OH\Big]_z\Big]_Y$$

and $$\left[\begin{array}{c}A\\ \\ \\A\end{array}\right\rangle P-O-CH_2\Big]\!\!-\!C\Big[-CH_2OH\Big]_z\Big]_Y$$

wherein R is selected from the group consisting of hydrogen and alkyl of 1 to 6 carbon atoms, A is a chalcogen independently selected from the group consisting of oxygen and sulfur, Y is 1 to 4, Z is 0 to 3, and the sum of Y and Z is 4.

2. The compound according to claim 1 of the formula:

$$C\Big[-CH_2OP\begin{array}{c}O-CH_2\\ \\O-CH_2\end{array}\Big]_4$$

3. The compound according to claim 1 of the formula:

$$\left[\begin{array}{c}CH_2-O\\|\\CH_2-O\end{array}\right\rangle P-O-CH_2\Big]_2\!-\!C\begin{array}{c}CH_2OH\\ \\CH_2OH\end{array}$$

4. A process for preparing a cyclic phosphorus ester selected from the group consisting of

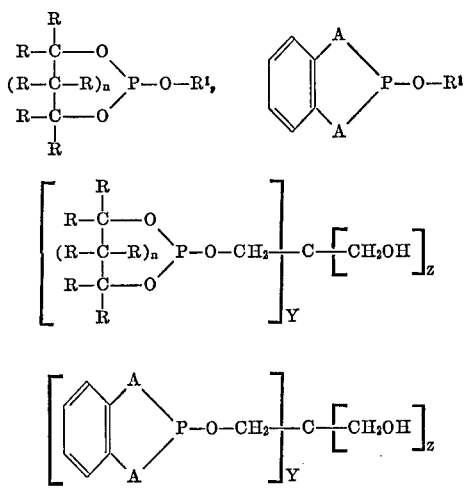

and

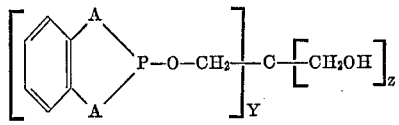

wherein R is independently selected from the group consisting of hydrogen and alkyl of 1 to 6 carbon atoms, $R^1$ is alkyl of 1 to 24 carbon atoms, A is a chalcogen independently selected from the group consisting of oxygen and sulfur, $n$ is 0 to 1, Y is 1 to 4, Z is 0 to 3, and the sum of Z and Y is 4, which comprises reacting under substantially anhydrous conditions, a cyclic phosphorus anhydride selected from the group consisting of

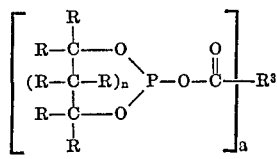

and

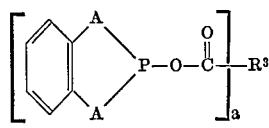

wherein $a$ is 1 to 2 and when $a$ is 1, $R^3$ is selected from the group consisting of hydrogen, alkyl of 1 to 18 carbon atoms, alkenyl of 2 to 18 carbon atoms, aryl of 6 to 18 carbon atoms, alkylene of 1 to 18 carbon atoms, alkenylene of 2 to 18 carbon atoms, and arylene of 6 to 18 carbon atoms, with a hydroxyaliphatic compound selected from the group consisting of $R^1OH$ and $C[CH_2OH]_4$, at a temperature in the range of from $-10$ degrees centigrade to about 125 degrees centigrade.

5. A process according to claim 4 wherein the desired cyclic phosphorus ester is recovered from the reaction mixture.

6. A process according to claim 5 wherein the reaction mixture is maintained at a temperature in the range of from $-20$ degrees centigrade to about 45 degrees centigrade.

7. A process according to claim 6 wherein the hydroxyaliphatic compound is $R^1OH$, and the reaction product is selected from the group consisting of

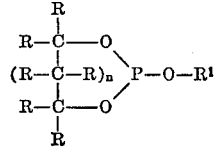

and

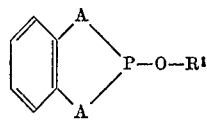

8. A process according to claim 6 wherein the hydroxyaliphatic compound is

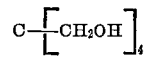

and the reaction product is selected from the group consisting of

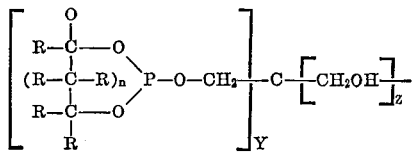

and

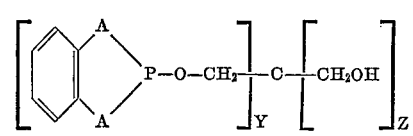

9. A process according to claim 5 wherein a solvent for the reaction is employed.

10. A process according to claim 9 wherein the reactants are present in stoichiometric molar proportions.

References Cited

UNITED STATES PATENTS 3,201,437   8/1965   Friedman _____ 260—927

CHARLES B. PARKER, Primary Examiner

R. L. RAYMOND, Assistant Examiner

U.S. Cl. X.R.

252—8, 46, 49, 406, 407; 260—935, 937, 971

PO-1050
(5/69)

UNITED STATES PATENT OFFICE
CERTIFICATE OF CORRECTION

Patent No. 3,459,835      Dated August 5, 1969

Inventor(s) - James L. Dever and James J. Hodan

It is certified that error appears in the above-identified patent and that said Letters Patent are hereby corrected as shown below:

Column 2, line 15 and 22, change that portion of the formula which reads

Column 3, lines 16 and 22, change that portion of the formula which reads

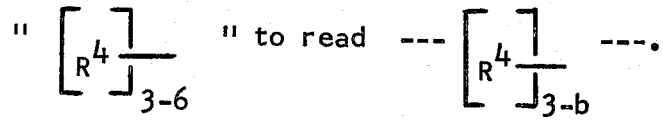

Column 2, line 29, delete "calcogen" and insert -- chalcogen --;
Column 3, line 36, delete "calcogen" and insert -- chalcogen --;
Column 4, line 54, delete "hexandecanol" and insert -- hexadecanol --;
Column 4, line 56, delete "ethylene; glycol and insert -- ethylene glycol --;  Column 6, line 53, delete "dioxophospholane" and insert -- dioxaphospholane --;  Column 8, line 19, delete " decyloxy-2,32" and insert -- decyloxy-1,3,2- --;  Column 8, line 43, delete "0.04 milliliter" and insert -- 0.04 millimeter --;  Column 8, line 64, delete "merucry" and insert -- mercury --; Column 10, line 7, delete that portion of the formula which reads

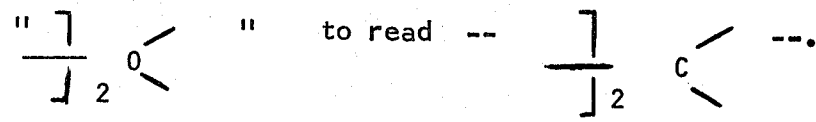

PO-1050
(5/69)

UNITED STATES PATENT OFFICE
CERTIFICATE OF CORRECTION

Patent No. 3,459,835　　　　　　　　　　Dated August 5, 1969

Inventor(s)　　James L. Dever and James J. Hodan

It is certified that error appears in the above-identified patent and that said Letters Patent are hereby corrected as shown below:

Column 10, line 12, delete "novalak" and insert -- novolak --;
Column 12, line 3, delete "-20 degrees" and insert -- 20 degrees --;
Column 12, line 30, Claim 8, that portion of the formula reading

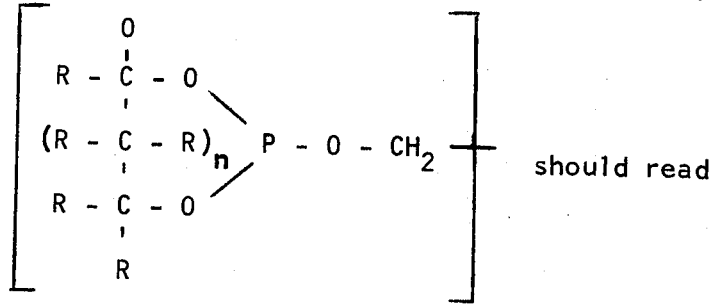 should read

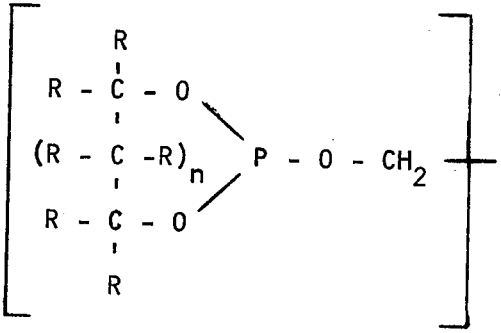

SIGNED AND
SEALED
NOV 3 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,459,835                Dated   August 5, 1969

Inventor(s)    - James L. Dever and James J. Hodan

It is certified that error appears in the above-identified patent and that said Letters Patent are hereby corrected as shown below:

Column 2, line 15 and 22, change that portion of the formula which reads

Column 3, lines 16 and 22, change that portion of the formula which reads

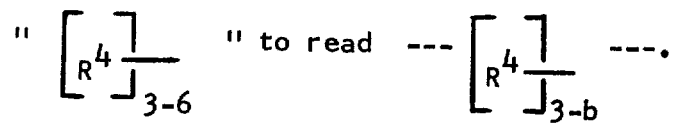

Column 2, line 29, delete "calcogen" and insert -- chalcogen --;
Column 3, line 36, delete "calcogen" and insert -- chalcogen --;
Column 4, line 54, delete "hexandecanol" and insert -- hexadecanol --;
Column 4, line 56, delete "ethylene; glycol and insert -- ethylene glycol --; Column 6, line 53, delete "dioxophospholane" and insert -- dioxaphospholane --; Column 8, line 19, delete " decyloxy-2,32" and insert -- decyloxy-1,3,2- --; Column 8, line 43, delete "0.04 milliliter" and insert -- 0.04 millimeter --; Column 8, line 64, delete "merucry" and insert -- mercury --; Column 10, line 7, delete that portion of the formula which reads

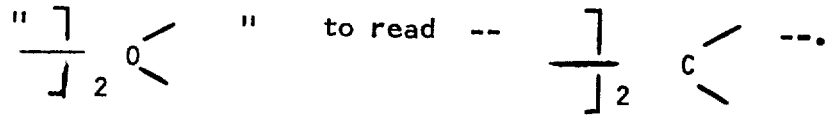

PO-1050
(5/69)

UNITED STATES PATENT OFFICE
CERTIFICATE OF CORRECTION

Patent No. 3,459,835                             Dated August 5, 1969

Inventor(s)    James L. Dever and James J. Hodan

It is certified that error appears in the above-identified patent and that said Letters Patent are hereby corrected as shown below:

Column 10, line 12, delete "novalak" and insert -- novolak --;
Column 12, line 3, delete "-20 degrees" and insert -- 20 degrees --;
Column 12, line 30, Claim 8, that portion of the formula reading

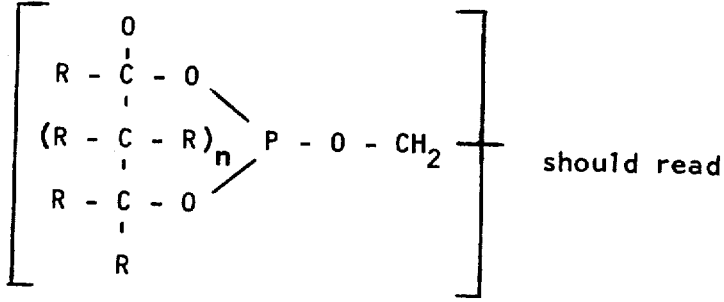   should read

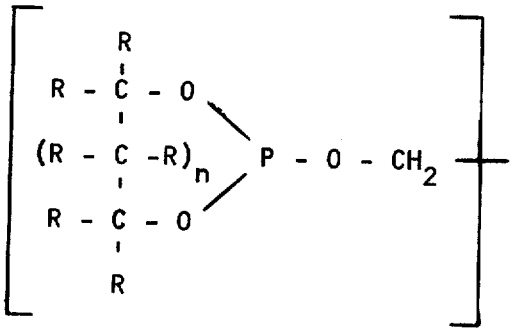

SIGNED AND
SEALED
NOV 3 1970

(SEAL)
Attest:

Edward M. Fletcher, Jr.
Attesting Officer

WILLIAM E. SCHUYLER, JR.
Commissioner of Patents